Feb. 16, 1965 R. J. COVERT ETAL 3,169,567
PUNCTURE REPAIR
Filed June 27, 1963

INVENTORS
Robert J. Covert
Howard W. Davis
BY George E. Talmage
Hood, Gust & Irish
Attorneys.

United States Patent Office 3,169,567
Patented Feb. 16, 1965

3,169,567
PUNCTURE REPAIR
Robert J. Covert and Howard W. Davis, Hamilton County, and George E. Talmage, Indianapolis, Ind., assignors to Bowes "Seal Fast" Corporation, Indianapolis, Ind., a corporation of Indiana
Filed June 27, 1963, Ser. No. 291,187
11 Claims. (Cl. 152—370)

The advent of tubeless tires for automobiles in recent years has inspired a recrudescence of activity in the very old art of puncture repair for such tires without dismounting the tire from the wheel. More than fifty years ago, it was common practice to repair punctured tubeless bicycle tires by stuffing rubber bands, in multiple plies, into the puncture by means of a needle, much in the manner suggested in, for instance, the patent to Mullen No. 2,803,-284 issued August 20, 1957. Currently, emphasis in development of this art is on materials to be used for so filling a puncture; as exemplified in, for instance, Patent 3,035,626 issued May 22, 1962, and Patent 3,049,164 issued August 14, 1962.

We have found that an integrated strand material, comprising a tubular, reticulate sleeve, interiorly filled and exteriorly coated with a yieldable, somewhat elastic, air-impervious, generally rubber-like material is optimum for such use; but previously-known materials in this category and with which we are familiar possess certain inherent defects including poor uniformity in diameter, insufficient shear strength, susceptibility to breakdown by "peeling" or "stripping" of the filler-coating material from the sleeve, and others.

The primary object of the present invention, then, is to provide a material of the class indicated which shall be free from the defects of materials heretofore known to us, while fully possessing all of the functional advantages of such previously-known materials.

A further object of the invention is to provide a puncture sealing material generally of the character above described in which the reticulate sleeve is knitted from strand material which is sufficiently fibrous so that the filler-coating material may permeate the strand material, penetrating the minute interstices between the individual fibers of the strand material to establish a firm anchorage between the mass of filler within the sleeve and the mass of coating outside the sleeve and between those masses and the body of the sleeve. Still another object of the invention is to provide a puncture sealing material of the character just described in which the strand material from which the sleeve is formed includes at least one continuous monofilament having a diameter greatly exceeding that at any one of the multiplicity of fibers in the composite strand.

A still further object of the invention is to provide a puncture sealing material of the character described in which the reticulate sleeve is knitted from composite strand material which is inherently capable of production in much more uniform diameter than is possible with strand material of any type heretofore used in an analogous environment. As a corollary to the last-mentioned object, it is an object of the invention to provide a puncture sealing material in which the reticulate sleeve may feasibly be commercially produced with a better diametrical uniformity than has been found in analogous materials heretofore known to us, and in which, as a consequence, an improved diametrical uniformity of the finished puncture repair material, without inverse variation in the thickness of the layer of coating material outside the reticulate sleeve, is achieved.

Still further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Figure 5:
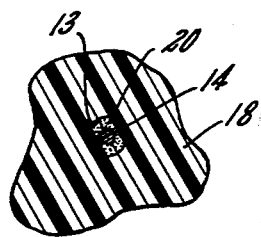
Figure 4:
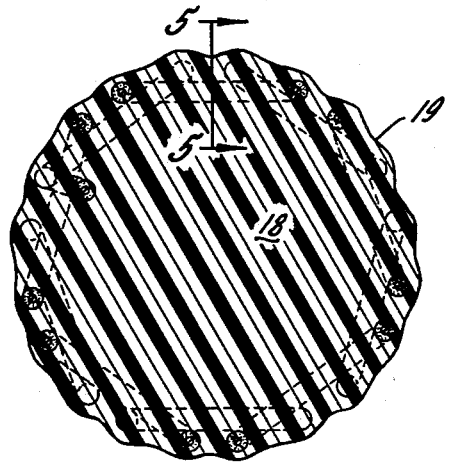

FIG. 4 is a section, drawn to a larger scale, and showing the completed puncture sealing material with a mass of permanently-distortable, somewhat elastic, air-impervious, homogeneous material interiorly filling, exteriorly coating, and thus wholly embedding the reticulate sleeve; and FIG. 5 is a fragmentary section taken substantially on the line 5—5 of FIG. 4 and drawn to a further enlarged scale to illustrate the permeation of the strand material by the filling-coating material.

For optimum accomplishment of the stated objects of the present invention, and to overcome most effectively the inherent deficiencies of previously-known materials for use in sealing punctures in tubeless tires, we deem it to be essential that the reticulate sleeve, which acts as a skeleton for the puncture sealing material, shall be produced from composite strand material made up of a great multiplicity of tiny, hair-like, continuous threads or fibers. We presently believe that the preponderant portion of such composite strand material should preferably consist of nylon yarn, and the best nylon yarn presently known to us for the purpose is available on the open market under the identifying designation of Du Pont's 420–68–1–Z–330 nylon yarn. Such yarn consists of 68 threads of nylon filament, each thread having a diameter of approximately 0.0007". As commercially available, the individual threads of such yarn are substantially continuous in any length of yarn and are arranged in substantial parallelism, though we presently believe that the yarn may be somewhat twisted without significantly affecting its utility in our invention.

We have found that when two or three strands of such yarn are laid in parallel and are fed concurrently through a knitting machine to produce a loosely knitted, and therefore reticulate, sleeve, such a sleeve may be effectively used in our invention; but we have found that a sleeve so produced is somewhat difficult to handle through the succeeding steps in the production of puncture repair material because of the inherent softness and low resiliency of the yarn.

Therefore, in the preferred form of our invention, we include with two strands of the above-identified nylon yarn one monofilament of 0.006" nylon. The two strands or plies of yarn and the single nylon monofilament thus are laid in parallel and are fed concurrently through a knitting machine to produce a loosely knitted, tubular sleeve made up of composite strand material comprising 136 hair-like nylon fibers and the much heavier nylon monofilament.

The individual runs and loops of such a composite strand are permeable radially and peripherally of the sleeve. Thus, the filler material which is a component of the finished puncture sealing product may penetrate not only the relatively large openings within and between the individual loops of strand material, but also the minute interstices between the individual threads or fibers of the composite strand material, whereby the homogeneity of the puncture sealing product is improved and its resistance to air penetration is heightened and whereby, further, the anchorage between the filler material within the sleeve and the coating material outside the sleeve is greatly strengthened, and the coating material is intimately anchored within the body of the composite strand material, to provide against stripping or peeling of coating material from the external surface of the seal.

Figure 1:
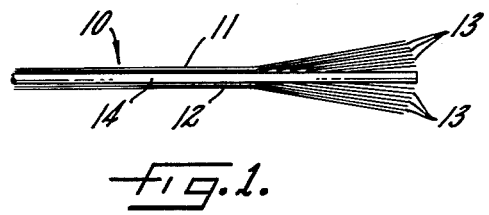
FIG. 1 is a somewhat diagrammatic illustration, greatly magnified, of a short length of the composite strand material from which a reticulate sleeve may be produced in the optimum form of the present invention.
Figure 2:
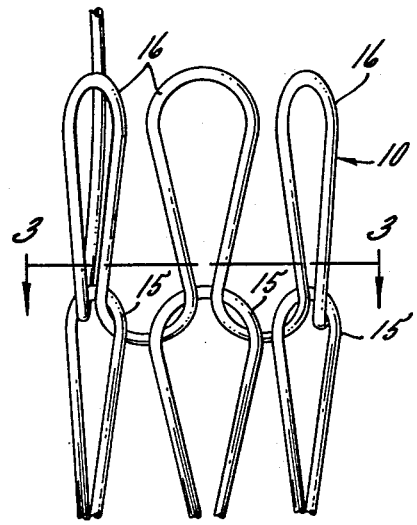
FIG. 2 is a fragmentary illustration of portions of two adjacent courses of knitted loops formed from the composite strand material of FIG. 1 in the production of an optimum form of reticulate sleeve, the composite strand having the appearance of a monofilament, for facility of illustration.
Figure 3:
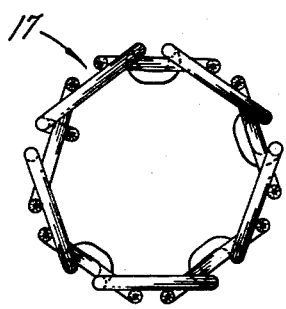
FIG. 3 is a section, taken substantially on the line 3—3 of FIG. 2, illustrating the tubular form of the reticulate sleeve and suggesting the composite character of the strand material from which the sleeve is formed.

The optimum form of our invention is illustrated, somewhat diagrammatically, in the drawings. Thus, the composite strand material is indicated generally by the reference numeral 10 in FIG. 1, such material comprising one ply 11 and one ply 12 of nylon yarn, each consisting of a multiplicity of continuous, hair-like threads 13, together with one ply 14 of nylon monofilament having a thickness or diameter greatly in excess of that of any one of the fibers 13. In the sizes presently deemed preferable, the strand 10 comprises approximately 80% by weight and 65% by diametric measurement nylon yarn, and 20% by weight and 35% by diametric measurement 0.006″ nylon monofilament. Each of the three plies is led from its own spool into the knitting machine and the three plies run concurrently through that machine. It is found that the individual fibers 13 of the yarn plies 11 and 12 tend to distribute themselves about the monofilament 14 as a core, but not with the degree of symmetry which is suggested in FIGS. 3, 4 and 5 of the drawings, to constitute a composite strand.

In the knitting machine, the composite strand material is manipulated to form successive courses of peripherally arranged loops 15 and 16, interlocked conventionally to define a tubular sleeve indicated generally by the reference numeral 17. Inherently, such a knitted sleeve will be reticulate, and we presently believe knitting to be the optimum procedure for sleeve construction. However, any other process through which such a reticulate sleeve can be constructed from such a composite strand may be utilized.

After the sleeve has been constructed (or, in some instances, concurrently with its construction), a suitable filler-coating material is assembled therewith to fill the interior, coat the exterior and thereby wholly embed the sleeve. One procedure for such embedment comprises extrusion of the filler-coating material through a suitable nozzle as the sleeve is concurrently moved through the nozzle.

The filler-coating material must be substantially impervious to air, it should be fluent during the embedding operation and it should be permanently distortable. Preferably, it will be compressible and to some extent elastic. It must be capable, during the embedment process, of sufficiently free flow under pressure to penetrate and permeate the body of the composite strand material from which the sleeve is constructed; yet it must be sufficiently self-sustaining, after embedment has been completed, and sufficiently non-tacky and non-adhesive so that adjacent runs of the finished material will not tenaciously adhere to each other or to foreign objects with which they may come in contact. It must, of course, be inert with respect to the rubberoid materials from which tire casings are customarily formed and it is preferably homogeneous in composition.

One such material which we have found to be satisfactory as a filler-coating is that disclosed in the said prior Patent 3,049,164; viz., the polysulfide polymer known on the market as LP-2 "Thiokol" which is a polymer of bis (ethylene oxy) methane containing disulfide linkages with terminal thiol (—SH) groups and having the empirical formula:

$$HS(C_2H_4-O-CH_2-O-C_2H_4-S-S)_{23}$$
$$-C_2H_4-O-CH_2-O-C_2H_4-SH$$

As is explained in the said prior patent, 10 parts of a polysulfide base consisting of liquid polysulfide polymer (as above) 100 parts and carbon black 30 parts, may preferably be mixed with 1 part of a curing agent consisting of lead dioxide 70 parts and stearic acid 30 parts to produce a suitable filler-coating material; but many other substances having the characteristics above described may be used in place of this particular formulation. For instance, we presently believe neoprene and polyurethane to be examples of such other substances.

In FIG. 4, we have illustrated the manner in which the main mass 18 of filler material completely fills the interior of the sleeve 17 and penetrates the loops of the sleeve to constitute a cover or coating 19 for the sleeve, whereby the sleeve is wholly embedded in the mass of filler-coating material. In FIG. 5, we have illustrated the fact that the filler-coating material permeates the body of the strand 10, penetrating the minute interstices 20 between the individual, hair-like fibers 13 of the composite strand material.

We presently believe that, for its intended use, the optimum diameter of the finished puncture sealing material should be approximately 0.105″, and that the acceptable range of such diameter is from 0.098″ to 0.112″. In some previously-available puncture repair materials of generally similar structure, it has been customary to require a minimum diametrical dimension of 0.110″; but it was found in practice that the external coat of the repair material was almost invariably stripped away to some extent either in threading the material through the eye of the applicator needle or in forcing the material into place in the puncture or both. Because the reticulate sleeve 17 of our invention can be commercially produced in highly uniform diameter, so that the thickness of its outer coating may also be extremely uniform, because of the intimate permeation of the filler-coating material through the body of the strand material from which the sleeve is formed and because of the homogeneity of the filler-coating material transversely of the entire length of the puncture repair material, such stripping of the coating does not occur either as the repair material is moved through the needle eye or as it is moved within the puncture; and therefore, since the operator can depend upon having the full original thickness of material deposited within the puncture, a somewhat smaller original diameter is entirely acceptable. It will be apparent, however, that for use in sealing punctures in products other than automobile tires, different dimensions may be acceptable.

It is, of course, highly desirable to maintain uniformity in the puncture sealing material for commercial use. When the material is supplied in the sizes above suggested, it will be effective for most repairable punctures if four thicknesses of the material are deposited within the puncture by passing a length of the material through the eye of a needle, forcing the needle eye through the puncture hole and into the interior of the tire and then withdrawing the needle and clipping the repair material. If an operator is accustomed to making repairs with material having a diameter in the range above-suggested, and is unexpectedly supplied with material having a diameter of, for instance, 0.075″, he will have failures because he will unwittingly deposit too small an amount of sealing material in a given puncture. As has been pointed out above, uniformity of diameter is more effectively maintained according to the present invention because the nylon components of the composite strand can be produced in greater uniformity than is possible with materials heretofore used in a similar environment. It is found, further, that uniformity in the finished product is affected by the setting of the knitting machine and we presently believe that the sleeve 17 should be produced within a range between 6.5 courses per inch (c.p.i.) and 7.5 courses per inch.

We claim as our invention:

1. A puncture sealing material comprising an elongated strand including a loosely knitted sleeve formed from a multiplicity of hair-like threads substantially paralleling a monofilament, said sleeve being filled with and completely embedded in a homogeneous mass of substantially air-impervious, permanently-distortable material.

2. A puncture sealing material comprising a tubular sleeve loosely knitted from a composite strand including a multiplicity of continuous, substantially parallel fibers of infinitesimal cross section, each of said fibers having a cross sectional dimension of approximately 0.0007", a continuous monofilament substantially paralleling said fibers and having a cross sectional dimension approximately 8.5 times the cross sectional dimension of each of said fibers, and a mass of substantially air-impervious, permanently-distortable material filling and wholly embedding said sleeve and permeating interstices between said fibers.

3. The puncture sealing material of claim 2 in which said fibers and said monofilament are nylon.

4. The puncture sealing material of claim 2 in which the diameter of said sealing material is approximately 0.105".

5. The puncture sealing material of claim 2 in which the diameter of said sealing material is within the range between 0.098" and 0.112".

6. A puncture sealing material comprising a tubular sleeve knitted from a composite strand consisting of two plies of nylon yarn, each such ply consisting of approximately 68 filaments each approximately 0.0007" in diameter and a single ply of 0.006" nylon monofilament, and a mass of substantially air-impervious, permanently-distortable material filling and embedding said sleeve.

7. The puncture sealing material of claim 6 in which said mass is a chemically inert, non-fibrous polysulfide.

8. The puncture sealing material of claim 7 in which the diameter of said sealing material is uniform throughout within the range between 0.098" and 0.112".

9. The puncture sealing material of claim 6 in which said mass is polyurethane.

10. The puncture sealing material of claim 6 in which said mass is neoprene.

11. The puncture sealing material of claim 6 in which the c.p.i. range of said sleeve is between 6.5 and 7.5.

References Cited by the Examiner

UNITED STATES PATENTS

| | | | |
|---|---|---|---|
| 2,987,094 | 6/61 | Urbon | 152—357 |
| 3,003,344 | 10/61 | Clarke | 66—202 X |
| 3,035,626 | 5/62 | Mullen | 152—370 |
| 3,049,164 | 8/62 | Humphreys et al. | 152—370 |

ARTHUR L. LA POINT, *Primary Examiner.*